(12) United States Patent
Mentz et al.

(10) Patent No.: US 9,204,135 B2
(45) Date of Patent: Dec. 1, 2015

(54) METHOD AND APPARATUS FOR PRESENTING CONTENT TO NON-3D GLASS WEARERS VIA 3D DISPLAY

(71) Applicant: Bit Cauldron Corporation, Gainesville, FL (US)

(72) Inventors: James Mentz, Gainesville, FL (US); Samuel Caldwell, Palm Harbor, FL (US)

(73) Assignee: BIT CAULDRON CORPORATION, Gainesville, FL (US)

( * ) Notice: Subject to any disclaimer, the term of this patent is extended or adjusted under 35 U.S.C. 154(b) by 325 days.

(21) Appl. No.: 13/627,746

(22) Filed: Sep. 26, 2012

(65) Prior Publication Data

US 2013/0076874 A1    Mar. 28, 2013

Related U.S. Application Data

(60) Provisional application No. 61/539,369, filed on Sep. 26, 2011.

(51) Int. Cl.
*H04N 13/00*     (2006.01)
*H04N 13/04*     (2006.01)

(52) U.S. Cl.
CPC ....... *H04N 13/0434* (2013.01); *H04N 13/0438* (2013.01); *H04N 13/0447* (2013.01); *H04N 13/0452* (2013.01); *H04N 13/0456* (2013.01); *H04N 13/0497* (2013.01)

(58) Field of Classification Search
USPC ........................................ 348/51
See application file for complete search history.

(56) References Cited

U.S. PATENT DOCUMENTS

| | | | | |
|---|---|---|---|---|
| 2005/0117215 A1* | 6/2005 | Lange | ............................ | 359/462 |
| 2011/0050850 A1* | 3/2011 | Yamada | .......................... | 348/43 |
| 2011/0242288 A1* | 10/2011 | Francisco | ........................ | 348/51 |
| 2011/0261170 A1* | 10/2011 | Matsubara | ....................... | 348/51 |
| 2011/0273541 A1* | 11/2011 | Kitazato | .......................... | 348/51 |

OTHER PUBLICATIONS

Didyk et al. A perceptual model for disparity. In ACM SIGGRAPH 2011 papers (SIGGRAPH '11), Hugues Hoppe (Ed.). ACM, New York, NY, USA, Jul. 2011.*

* cited by examiner

*Primary Examiner* — Jay Patel
*Assistant Examiner* — Frank Huang
(74) *Attorney, Agent, or Firm* — Saliwanchik, Lloyd & Eisenschenk

(57) ABSTRACT

Embodiments of the invention pertain to a method and apparatus for controlling what non-3D glass wearers see from a 3D display. Such control is accomplished by controlling the images displayed on a 3D display, which allows a 3D-glass wearer to see a 3D image and/or video content while controlling one or more of the following: the content of the right eye image, the left eye image, the timing of displaying the right eye image, the timing of displaying the left eye image, the polarization of the right eye image (for polarization based 3D), the polarization of the left eye image (for polarization based 3D), the shuttering of the right lens (for shutter based 3D), the shuttering of the left lens (for shutter based 3D), and other images displayed not available to the 3D glass wearer, and/or controlling other aspects of the presented images and/or presentation of the presented images.

8 Claims, 2 Drawing Sheets

|   | L1 | R1 | L2 | R2 | L1 | R1 | L2 | R2 |
|---|----|----|----|----|----|----|----|----|
| 1 | O∅ | ∅O | ∅∅ | ∅∅ | O∅ | ∅O | ∅∅ | ∅∅ |
| 2 | ∅∅ | ∅∅ | O∅ | ∅O | ∅∅ | ∅∅ | O∅ | ∅O |

FIG. 1F

METHOD AND APPARATUS FOR PRESENTING CONTENT TO NON-3D GLASS WEARERS VIA 3D DISPLAY

CROSS-REFERENCE TO RELATED APPLICATION

The present application claims the benefit of U.S. Provisional Application Ser. No. 61/539,369, filed Sep. 26, 2011, which is hereby incorporated by reference herein in its entirety, including any figures, tables, or drawings.

BACKGROUND OF INVENTION

When three-dimensional (3D) images and/or video content is displayed for viewers wearing either polarization-based 3D glasses or shutter-based 3D glasses, people without glasses can see the images displayed for creation of the 3D images or video content. Often these people without 3D glasses find the displayed content, which can be considered 2D content for viewers without 3D glasses, to be fuzzy and, therefore, at least somewhat undesirable to watch. In other situations, such 2D viewers can perceive the 2D content to be of sufficient quality that there is a disincentive to pay for, e.g., rent, 3D glasses, such that providers of the 3D content would prefer the 2D content to be less desirable to watch, in order to encourage the purchase or rental of 3D glasses. Still in other situations, the providers of 3D content may want to provide additional content, or less content, to the 2D viewers, such as an advertisement of where to buy or rent 3D glasses.

BRIEF SUMMARY

Embodiments of the invention pertain to a method and apparatus for controlling what non-3D glass wearers see from a 3D display. Such control is accomplished by controlling the images displayed on a 3D display, which allows a 3D-glass wearer to see a 3D image and/or video content while controlling one or more of the following: the content of the right eye image, the left eye image, the timing of displaying the right eye image, the timing of displaying the left eye image, the polarization of the right eye image (for polarization based 3D), the polarization of the left eye image (for polarization based 3D), the shuttering of the right lens (for shutter based 3D), the shuttering of the left lens (for shutter based 3D), and other images displayed not available to the 3D glass wearer, and/or controlling other aspects of the presented images and/or presentation of the presented images.

BRIEF DESCRIPTION OF DRAWINGS

FIGS. 1A-1F show various sequencing of image presentations for 3D glass wearers in accordance with various embodiments of the subject invention.

DETAILED DISCLOSURE

Embodiments of the invention pertain to a method and apparatus for controlling what non-3D glass wearers see from a 3D display. Such control is accomplished by controlling the images displayed on a 3D display, which allows a 3D-glass wearer to see a 3D image and/or video content while controlling one or more of the following: the content of the right eye image, the left eye image, the timing of displaying the right eye image, the timing of displaying the left eye image, the polarization of the right eye image (for polarization based 3D), the polarization of the left eye image (for polarization based 3D), the shuttering of the right lens (for shutter based 3D), the shuttering of the left lens (for shutter based 3D), and other images displayed not available to the 3D glass wearer, and/or controlling other aspects of the presented images and/or presentation of the presented images.

Figure 1A:
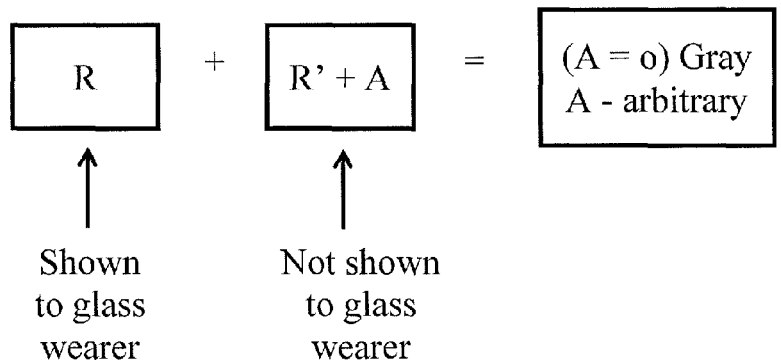

Referring to FIG. 1A, one image, R, which is called right, and one image that is anti-right, R', such that the result of R+R' can be gray. Another image, A, can be added such that R+R'+A can be partly gray. If R' is anti-right, and A is arbitrary, then R+R'+A is arbitrary. If a person is wearing 3D shutter glasses, the wearer can see two-dimensional (2D) content, as shown in FIGS. 1A, 1B, 1C, and 1E, or three-dimensional (3D) content, as shown in FIGS. 1D and 1F. In the example shown in FIG. 1A, there is no left image showing but such a left image could be added, e.g., as shown in Figure 1F. Accordingly, in a specific embodiment, glass wearers can be shown R, by shuttering the lens closed when R'+A is displayed, while in the same environment people without 3D shutter glasses will see R+R'+A. Of course, FIG. 1A shows a 2D version of the same image to both of the wearer's eyes. In this way, R+R'+A can be a gray screen to the people without shutter glasses.

Figure 1B:
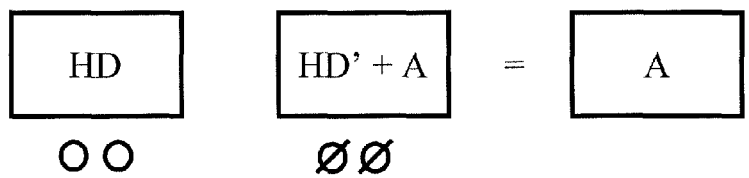
Figure 1C:
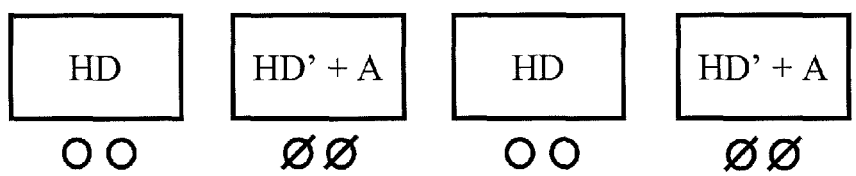
Figure 1D:
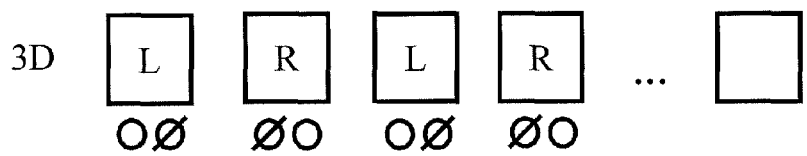

FIGS. 1B and 1C show how the embodiment of FIG. 1A would work with R replaced with HD and R' replaced with HD'. The o's under the image represent lens such that oo means both the left and right lenses are open, o$\phi$ means the left is open and the right is closed, $\phi$o means the left is closed and the right is open, and $\phi\phi$ means both lenses are closed. Although much of the description is presented in relation to 3D shutter glasses the same description is also applicable to polarization based 3D glasses, such that, for example, o means the polarization of the image is such that the image passes through the polarized filter of the 3D glasses to the wearer's eye, while $\phi$ means the polarization of the image is such that the image does not pass through the polarized filter of the 3D glasses to the wearer's eye. FIG. 1C shows how a 3D glass wearer would see HD. For a person without 3D glasses seeing both HD and HD'+A, the HD and HD' can cancel and create gray. In this way the color space can be subtracted. When the person without glasses is watching the video, the person is in additive color space. Half the time light is sent to the person, the other half of the time black can be sent to the person, resulting in gray. In this way, the non-3D glasses user sees gray, and the 3D glasses user still sees color and in 2D. In this way, the desired content can be shown to a 3D glasses wearer without allowing non-3D glasses wearers to see the content. Referring to FIG. 1F, the 3D glasses wearer (1) could see the 3D content in 3D while the non-glasses user (2), with all $\phi$'s changed to o's sees the summation of L1, R1, L2 and R2.

Figure 1E:
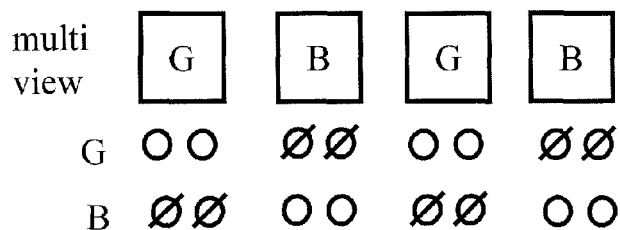
Figure 1F:
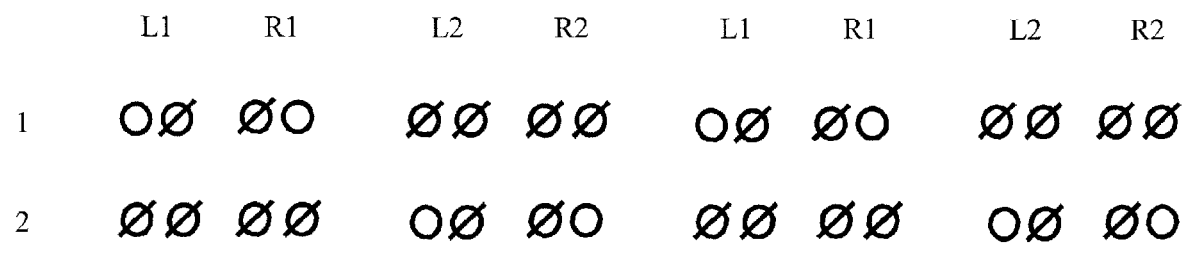

More complex sequences can also be implemented. FIG. 1D shows how 3D works with a 3D glasses wearer. Figure 1E shows what can be referred to as multi-view. Multi-view allows one person to watch one video, such as HD, and another person to watch another video, such as HD', where their shutter glasses are out of synch. FIG. 1F shows how 3D multi-view can be implemented in accordance with an embodiment of the invention. One 3D viewer, 1, can be watching a PG version of the content, while another viewer, 2, can be watching a G version of the content. In this way, control of which version of content a viewer sees can be controlled by controlling the version of 3D glasses the viewer uses.

Again, to see in 3D, the left eye lens is open while the content for the left eye is displayed, and the right eye lens is open while the content for the right eye is displayed. The left eye sees left, left, left, and the right eye sees right, right, right.

The right and left content is shown often enough that the viewer's brain does not notice the time segments without content when one of the eye's lens is closed, and the viewer's brain puts the right and left content together to perceive 3D. Multi-view can allow a first person to see the display as if a green car is racing on the racetrack and a second person is allowed to see the display as if a blue car is racing on the racetrack. In this way, the two people are driving around the racetrack in the game, while sitting next to each other in real space looking at the same display. Both people are watching the game, with person one's glasses open for person one's car frames and closed for person two's car frames, and person two's glasses are doing the exact opposite, closed for person one's car frames and open for person two's car frames. They are each seeing every other frame. They are basically taking turns seeing the 2D (FIG. 1E) or the 3D (FIG. 1F) display. So in either multi-view (2D) (FIG. 1E) or 3D (FIG. 1F), somebody watching without glasses on just sees the track without the green car or the blue car. Accordingly, embodiments of the invention can allow showing something other than the track to two different people.

In an embodiment, each eye is presented a frame every approximately 10 milliseconds. Further embodiments can use different cycle time periods depending on the circumstances. For a system having 240 frames/sec, each eye of both people can see a frame for about 4.2 msec starting every 16.7 msec such that each eye is not viewing a frame for about 12.5 msec between the end of one frame and the start of the next frame. If longer gaps between frames are used, the wearer can start seeing flutter. Accordingly, the embodiment illustrated in Figure IF allows two people to experience 3D racing, or other content, on the same display at the same time.

In another embodiment, FIG. 1F can be modified to allow four different people to watch four different contents in 2D by using each of person 1 and 2's right eye images for persons 3 and 4 and showing each image to both eyes of the shutter glass wearer. Because HD and HD', in FIGS. 1B and 1C, when using shutter glasses cannot have everything averaged to black for a user without glasses, in an embodiment everything is averaged to gray. In this way, the arbitrary image, A, can have some visual effects limitations as to what can and cannot be presented to a person without glasses. Polarization based 3D glasses need not have the same limitations. In an embodiment, a portion of the display frames is used to provide 3D to 3D glass wearers and a remaining portion of the display images can be used to clean up what people in the room without glasses see. Doing this can reduce the contrast of the 3D image, but may be desirable. As an example, the display frames can be allocated in groups of 5, or other number, such that frames 1 and 3 are for the 3D shutter glass wearer's right eye, frames 2 and 4 are for the wearer's left eye, and frame 5, which is not shown to the wearer, is used to modify the image the non-wearer sees. In a specific embodiment, an image can be preprocessed such that glasses wearers see the 3D version, and non-wearers see a 2D version, where the extra frames not shown to the wearers make the 2D version less fuzzy and/or more pleasant to watch.

In another embodiment, the frames are controlled such that without glasses, a person cannot enjoy the content that is being shown in 3D at all. This can be accomplished by using one or more extra frames not shown to the 3D glass wearer to cancel out enough of the content to not allow the non-wearer to meaningfully enjoy the visual content. In a further embodiment, a message can be displayed to the non-wearer as to how to acquire (such as rent or buy) the glasses used to watch the content, or some other form of advertisement can be shown to the non-wearer. Such embodiments can be accomplished by manipulating either the times for which shutters are open and closed, or the relative clarity of the images, the content of the images, or a combination of the same.

Embodiments of the invention can be implemented with 3D shutter glasses where the lenses are shuttered open and closed, or with 3D polarized glasses where each lens only passes images of a certain polarization to the wearer's eye. Accordingly, either lenses are shuttered open and closed or the polarities of projection images are modulated. An image can be made black by sending it with a polarity opposite to the polarity in the wearer's glasses, for wearers using polarized glasses, or the wearer's glasses can be turned from clear to dark. Light can have two mutually exclusive polarities, which can be used to provide images of a first polarization state passable through the left filter and provide images of a second polarization state passable through the right filter of the polarized glasses. Two examples involve orthogonal linearly polarized light and oppositely rotating circularly, or elliptically, polarized light, although there are many combinations of linear and/or elliptically/circularly polarized light that can be used. Shutter glasses can allow an arbitrary number of images in alternate frames with the lens for one or more wearer's glasses open and/or closed for any of the images. In this way, the left lens filter only accepts the left image and the right lens filter only accepts the right image.

Embodiments of the invention relate to methods and 3D shutter glasses systems that are not limited to two exclusive images, but can divide the projected image in time to a large number of images, limited by the speed and brightness of the display system. By utilizing more than two images in alternation, more complex sequences can be accomplished.

In an embodiment of the invention, a circular polarization filter can be used in each lens such that light (image) can be incident on the lens that produces a left eye image, a right eye image, or black. The ability to produce black, along with the ability to produce white, when using polarized based 3D glasses can allow the production of a third arbitrary image. This can allow control of whether the non-glasses wearer sees a 2D version of the 3D content, an image that does not allow the non-glasses wearer to enjoy the content, a gray screen, or some other message. Such a polarized image projection and polarized glasses system can be used with a home theater and also can be used in a movie theater. By using such a system, the glass wearer can see 3D content and other people without glasses can see 2D content that is not as fuzzy as with typical polarization based 3D systems, or even clear.

An embodiment of the invention enables the images to be processed and presented such that trying to view the 3D projected images without glasses in 2D will not work well, such as resulting in seeing a gray screen, a black screen, a white screen, or some other screen content that is not the 2D version of the 3D content, such as an advertisement or a message. In the same embodiment, the projected images can be transitioned as desired such that glass wearers see the 3D content and the non-wearers can see the 2D content, such that the operator can decide whether to allow non-wearers to see the 2D version of the content. In a further embodiment, a portion of the image is viewed as the 2D version of the 3D content when glasses are not worn, but other portions of the image change if the viewer is not wearing the glasses. As an example, glass wearers see a PG rated version of the content and non-wearers see a G-rated version of the content, such that particular aspects of the images can be different. A region of interest in the image can be manipulated such that only the region has a different appearance, based on whether or not someone is wearing glasses. As another example, if the content is a murder mystery movie, someone wearing the glasses can see more, or less, clues than people not wearing the glasses. This allows involving people in two different levels of thought and interaction and/or two different skill levels. Other examples, such as a game, a mystery, a clue find, a whodunit, and/or a clue-like movie, can provide different amounts of information to the viewer depending on whether the viewer is wearing glasses.

Referring to FIG. 1A, in a specific embodiment R can represent the desired image visible to the viewer of 3D glasses and image R' can represent the compliment of R, such that R combined with R' results in a gray image in the middle of the brightness scale. In an alternative embodiment, R can be combined with R", which can result in other output images such as a gray image not in the middle of the brightness scale. Depending on R, and R', there can often be limits on the range of colors and brightnesses with which the arbitrary image A can be rendered, and these limitations may be different for different regions of A. For example, a section of R that is white with a maximum brightness value will be summed with a section of R' that black with the minimum brightness value such that the combination of R and R' is gray in the middle of the brightness scale. Without manipulating R, the maximum dynamic range of A is limited to the range between gray and white. Each segment of A will have a minimum and maximum range of color and brightness based on the brightness of the segment of image R. If a region of R is completely black, then the corresponding region of A can display any image, but only up to half brightness, as R' will be displayed at full brightness half the time while R displays black half the time.

For each section of each image A will have a maximum and minimum brightness and range of colors which is limited by the content in R. This is of the most interest when R+R"=A is not a gray screen but an arbitrary image. To generate the arbitrary image, a range map can be generated that shows the values that can be placed in a segment of A. For a text message that can be of any minimum size, color, and word wrap configuration, the map of A is searched for the largest area in A where the text can be placed within a minimum color, size, word wrap and contrast ratio, and the text is placed in that region. Each characteristic, such as text size, contrast, and color and be given constraints and weighted priorities by which the optimal region and placement is chosen.

If the arbitrary image is to contain a graphic, such as an advertising logo, it may not be acceptable to change the color of the graphic and it may need to have both a minimum size and a minimum and maximum range of brightness. In this case, the arbitrary image map must be searched for the placement of the graphic that meets these additional constraints. One or more graphics may be provided with multiple sizes, content, color and layout schemes such that the image may be searched to find the graphic which can be placed with the most desirable results.

For some cases, such as live broadcasts, image A and the message on image A may need to be generated with a minimum of processing effort or latency, or without knowledge of what image map will be available for subsequent images. In this case, speed of processing power and readability of a message may be more important that the static nature of the color and contrast range in an image. Image A may contain text or graphics that are transparent. That is, image R' is black in the area of the text, such that text or graphics are formed by a stencil in the gray that allows the unaided eye to view image R, such as part of R is available through the stencil of the text or arbitrary graphic, such as the shape of a keyhole. In addition to A providing a transparent keyhole to fill text or graphics, A can create text or graphics filled with an image that tries to approximate a target color and brightness. Each section of A has the appearance of "swimming" or "moving" to track toward the target color and brightness as best the range map of A allows for that moment. In this way the screen can be filled with large block text of a constant size and a color and brightness that changes against a constant gray background, making it easy to read regardless of the content in R. The target color, brightness, and appearance of A can itself be a set of moving images, and each section of the target moving image for A can be changed it's entire possible range from one frame to the next to try to fastest match the target image, or each segment can be filtered such that the change in color or brightness appears slower, more desirable, or more appealing. A similar manipulation can be applied to R to improve the reproduction of the target image in A by balancing the color and brightness of R with the color and brightness of A. The text and graphics may be filled with transparency and outlined with a target color or color that produces the maximum desirable contrast or appearance for that frame, or painted in other combinations of the above methods.

All of the above methods can be applied to the two images of FIG. 1A or of the larger of more complex sequences of FIGS. 1B-1F. As the number of images increases, the number of combinations of content and arbitrary images increases, and the arbitrary image map and constraints can be determined for each sequence by adding and subtracting the images in the sequence from each other to determine the arbitrary image map. Each sequence can have all of the images added and subtracted from each other to generate a single arbitrary image map that shows the range of color and brightness possible for the arbitrary image available to the unaided eye.

All of these processes can be applied to a single image or to a stream of images that are sequenced in time to form a moving image, typically called video. If the video must be handled immediately without knowledge of a future image frame, then the arbitrary image is likely to be one of a style wherein the graphic or text is displayed in a constant position with a target color and brightness and the actual color and brightness changes as often as every frame as the actual image A is constrained by R, as in the case of letters with a transparent stencil to allow keyhole size previews of R within the text of A.

If there is time to process multiple frames of video before displaying them or sending them on to a display system, such as with a buffer or in off-line production system, then additional processing can be applied to determine a segment of time spanning multiple video frames during which the graphic or text can be displayed with a fixed or smoothly changing size, color, and brightness. The arbitrary image map information for each image, which contains the range of possible colors and brightnesses for each segment of each image, can be divided into groups of pictures, or segments in time during which an arbitrary image can be applied in a consistent manner. Many methods are known to one skilled in the art to segment moving image R into groups of pictures that each have similar characteristics. These group-of-pictures determination methods can be applied to R and the group-of-pictures (GOP) selected for R can be used as a reasonable GOP for the generation of A. Alternatively, we describe here a new GOP determination method that be used to determine GOPs for A. In an embodiment, each image in R has only a single color and brightness value for each segment, but the arbitrary image map has a maximum and minimum value for each color and brightness for each segment in A. Both these maximums, minimums, and how much they change can be looked at to determine a GOP which has the optimal or near optimal range and the least change in range, thus finding the GOP that can maintain A as a constant image or one that changes in a desirable manner.

In a home theater, the subject technology relating to presenting different content to 3D glasses wearers and non-glasses wearers can be combined with technology for the set top box to communicate with the glasses, and participation on an individual level can be measured. An embodiment can incorporate glasses that only turn on when the hinge is open, and when you take them off the springs close the hinges and the glasses turn off. This on-off switch can be an indication of whether or not the glasses are being worn, but may not be accurate as the glasses could be laid down without closing the glasses. The information as to whether the glasses are being worn can provide information as to which of the participants in the room have which clues that are presented in the image content. The story can be changed based on the information regarding who has been presented the clues and/or which additional clues you want to give which people with glasses. This can allow everybody a two-way experience, where everybody is supposed to take their glasses off once they figure out the mystery and if people still have their glasses on, more clues are presented. In the classroom, this technology allows teaching people at different speeds, and/or at different levels.

The arbitrary image described herein need not be arbitrary in the sense that it is unrelated to the content or rendered at a separate time than the content. In the previous example, the arbitrary image and the content are generated at the same time. In specific embodiments, the arbitrary image and the constraints on the brightness and color of the arbitrary image can be considered at production time. For example, an arbitrary image of a light colored object can usually be combined with a darker object. Human skin tones are rarely at a video systems maximum brightness value, and clothing can also be chosen to be at less than the maximum brightness value, allowing an image with contemporary level of clothing to be used as R and an image with more traditional coverage of lighter colored clothing to be displayed in A. The complimentary example is that a darker colored object and be placed upon a lighter colored image. For example, a mystery movie might have a note that contains a minor clue to viewers not wearing glasses, while a much bigger clue on the same note is also apparent to those wearing glasses. The compliment of each situation is also possible.

In an embodiment, pause can be supported. When an image display system is paused, the pause stops the progression of sets of sequences of images, but an individual sequence is still repeated at the same frame rate. In this manner the appearance of A by the combination of R and R' is maintained when the action and progression of the video is paused.

Aspects of the invention, such as processing images, controlling shutter glasses, controlling projection of images, detecting whether glasses are being worn, calculation of HD' and/or A and/or HD+HD'+A, and other features implemented, may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

The invention claimed is:

1. A method of presenting video content via a display, comprising:

presenting bxc images via a display during c consecutive time periods, and where b and c are integers greater than 1, wherein b images are presented during a corresponding b time segments of each time period of the consecutive time periods, so as to present b image sequences via the display during the c consecutive time periods, wherein each time period of the c time periods corresponds to a cycle of a corresponding c cycles with respect to a pair of glasses, wherein the $n^{th}$ image of the $m^{th}$ image sequence is displayed during the $m^{th}$ time segment of $n^{th}$ cycle of the pair of glasses, where m and n integers wherein each image sequence of the b image sequences, when viewed by a viewer in sequence, presents a corresponding video content of a corresponding b video contents to the viewer, controlling, via the pair of glasses whether a wearer of the pair of glasses sees each image sequence of the b image sequences via the wearer's left eye; and controlling whether the wearer of the pair of glasses sees each image sequence of the b image sequences via the wearer's right eye, wherein the wearer of the pair of glasses is presented a first video content, wherein a viewer of the display without the pair of glasses is presented a second video content, wherein the second video content is different from the first video content.

2. The method according to claim 1, wherein the pair of glasses are shutter glasses such that a right lens is shuttered open or closed during each time segment of the b time segments of each cycle of the pair of glasses and a left lens is shuttered open or closed during each time segment of the b time segments of each cycle of the pair of glasses, wherein when the right lens, or left lens, is shuttered open, the wearer's right eye, or the wearer's left eye, respectively, is presented the image presented via the display, wherein when the right lens, or left lens, is shuttered closed, the wearer's right eye, or the wearer's left eye, respectively, is not presented the image presented via the display.

3. The method according to claim 1, wherein the pair of glasses are polarization glasses such that a right lens allows images presented via the display having a first polarization to be presented to the right eye and prevents images presented via the display having a second polarization to be presented to the right eye, and a left lens allows images presented via the display having the second polarization to be presented to the left eye and prevents images presented via the display having the first polarization to be presented to the left eye.

4. The method according to claim 1, wherein the plurality of video contents comprises the first video content, wherein the second video content results from two video contents of the plurality of video contents being presented to the viewer of the display without the pair of glasses.

5. The method according to claim 1, wherein the first video content results from wo video contents of the plurality of video contents being presented to the wearer of the glasses such that one video content of the two video contents is presented to the wearer's right eye and another video content of the two contents is presented to the wearer's left eye.

6. The method according to claim 1, wherein the second video content results from two video contents of the plurality of video contents being presented to the viewer without the pair of glasses.

7. A method of presenting video content via a display, comprising:

presenting bxc images via a display during c consecutive time periods, and where b and c are integers greater than 1, wherein b images are presented during a corresponding b time segments of each time period of the consecutive time periods, so as to present b image sequences via the display during the c consecutive time periods, wherein each time period of the c time periods corresponds to a cycle of a corresponding c cycles with respect to a first pair of glasses and a second pair of glasses, wherein the $n^{th}$ image of the $m^{th}$ image sequence is displayed during the $m^{th}$ time segment of $n^{th}$ cycle of the pair of glasses, where m and n are integers wherein each image sequence of the b image sequences, when viewed by a viewer in sequence, presents a corresponding video content of a corresponding b video contents to the viewer, controlling, via the first pair of glasses whether a first wearer of the first pair of glasses sees each image sequence of the b image sequences via the first wearer's left eye; and controlling whether the first wearer of the first pair of glasses sees each image sequence of the b image sequences via the first wearer's right eye, controlling, via the second pair of glasses whether a second wearer of the second pair of glasses sees each image sequence of the b image sequences via the second wearer's left eye; and controlling whether the second wearer of the second pair of glasses sees each image sequence of the b image sequences via the second wearer's right eye, wherein the first wearer of the first pair of glasses is presented a first video content, wherein the second wearer of the second pair of glasses is presented a second video content, wherein the second video content is different from the first video content.

8. The method according to claim 7, wherein the plurality of video contents comprises the first video content, wherein the plurality of video contents comprises the second video content.